US009483475B2

(12) United States Patent
Tuffet Blaise et al.

(10) Patent No.: US 9,483,475 B2
(45) Date of Patent: Nov. 1, 2016

(54) CONTENT RECOMMENDATION METHOD (71) Applicant: HTC CORPORATION, Taoyuan, Taoyuan County (TW)

(72) Inventors: Augustin Tuffet Blaise, Taoyuan (TW); Ya-Chu Yang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 346 days.

(21) Appl. No.: 13/903,419

(22) Filed: May 28, 2013

(65) Prior Publication Data

US 2014/0181123 A1 Jun. 26, 2014

Related U.S. Application Data (60) Provisional application No. 61/746,005, filed on Dec. 26, 2012.

(51) Int. Cl.
*G06F 17/30* (2006.01)

(52) U.S. Cl.
CPC .............. *G06F 17/30038* (2013.01)

(58) Field of Classification Search
USPC ................. 707/748–749, 752–753
See application file for complete search history.

(56) References Cited

U.S. PATENT DOCUMENTS

| 7,305,390 | B2* | 12/2007 | Bowman ............ G06F 17/30675 |
| 7,613,693 | B1* | 11/2009 | Na et al. |
| 8,327,270 | B2* | 12/2012 | Jones ............ G09B 7/00 715/705 |
| 8,793,625 | B2* | 7/2014 | Rhee ............... H04M 1/72522 715/783 |
| 9,058,332 | B1 | 6/2015 | Darby ............... G06F 17/3005 |
| 2003/0040850 | A1* | 2/2003 | Najmi ............... G06F 3/0482 701/1 |
| 2007/0005581 | A1* | 1/2007 | Arrouye ............ G06F 17/301 |
| 2007/0035513 | A1* | 2/2007 | Sherrard ............ G06F 3/04817 345/157 |
| 2007/0043704 | A1* | 2/2007 | Raub ............... G06F 17/30867 |
| 2008/0221989 | A1* | 9/2008 | Messer et al. .................. 705/14 |
| 2009/0064007 | A1 | 3/2009 | Lazier et al. |
| 2009/0259660 | A1* | 10/2009 | Novy ............................ 707/7 |
| 2009/0319472 | A1 | 12/2009 | Jain et al. |
| 2010/0029303 | A1* | 2/2010 | Lim ............... H04L 12/1859 455/466 |
| 2010/0070486 | A1* | 3/2010 | Punaganti Venkata et al. ............. 707/722 |
| 2010/0175031 | A1* | 7/2010 | Alton ............... G06F 17/30855 715/841 |

(Continued)

FOREIGN PATENT DOCUMENTS

| CN | 102696028 A | 9/2012 |
| CN | 102799890 A | 11/2012 |
| TW | 201227553 A | 7/2012 |

OTHER PUBLICATIONS

Sirjani, Behzod and Katie Derthick, "Making Memories": A Mobile Application to Support Memory Making and Reminiscence. May 7-12, 2011, Vancouver, BC, Canada; pp. 1-6.

(Continued)

*Primary Examiner* — Hanh Thai
(74) *Attorney, Agent, or Firm* — Birch, Stewart, Kolasch & Birch, LLP (57) ABSTRACT A content recommendation method for use in a portable electronic device is provided. The method includes the steps of fetching current context information from the portable electronic device; calculating a relevant ranking value of each item within each type of media files stored in the portable electronic device based on the context information; sorting the relevant ranking value of each item within each type of the media files; highlighting at least one of the items of a first user interface of the portable electronic device according to the sorted ranking values.

20 Claims, 6 Drawing Sheets

(56) References Cited

U.S. PATENT DOCUMENTS

| | | | |
|---|---|---|---|
| 2010/0199219 A1* | 8/2010 | Poniatowski | G06F 3/0482 715/825 |
| 2010/0231533 A1* | 9/2010 | Chaudhri | G06F 3/04817 345/173 |
| 2010/0329183 A1* | 12/2010 | Onda | H04L 12/5692 370/328 |
| 2011/0153602 A1 | 6/2011 | Kiddle et al. | |
| 2011/0179453 A1* | 7/2011 | Poniatowski | G06F 3/0482 725/58 |
| 2011/0191218 A1* | 8/2011 | Muir | G06Q 10/1091 705/32 |
| 2012/0046050 A1* | 2/2012 | Hymel et al. | 455/456.3 |
| 2012/0060123 A1* | 3/2012 | Smith | G06F 3/04883 715/833 |
| 2012/0221687 A1* | 8/2012 | Hunter | G06F 17/30029 709/219 |
| 2013/0103550 A1* | 4/2013 | Nygaard | G06Q 30/00 705/27.1 |
| 2013/0111378 A1* | 5/2013 | Newman | H04M 1/67 715/764 |
| 2013/0111415 A1* | 5/2013 | Newman | G06F 1/3203 715/864 |
| 2013/0297447 A1* | 11/2013 | Sakata | 705/26.7 |
| 2014/0019253 A1* | 1/2014 | Ricasata | G06Q 30/0241 705/14.64 |
| 2014/0026098 A1* | 1/2014 | Gilman | G06F 3/0482 715/810 |
| 2014/0053108 A1* | 2/2014 | Johansson | H04M 1/67 715/846 |
| 2014/0078178 A1* | 3/2014 | Li | G09G 5/00 345/659 |
| 2014/0082514 A1* | 3/2014 | Sivaraman | G06F 3/0219 715/745 |
| 2014/0310643 A1* | 10/2014 | Karmanenko | G06F 1/1626 715/784 |
| 2016/0098189 A1* | 4/2016 | Goertz | G06F 3/0481 715/703 |

OTHER PUBLICATIONS

Wolfgang Woerndl and Aleksandar Hristov, "Recommending Resources in Mobile Personal Information Management" IEEE (2009), pp. 149-154.

European Office Communication, dated Nov. 27, 2015, for European Application No. 13 197 342.2.

* cited by examiner

CONTENT RECOMMENDATION METHOD

CROSS REFERENCE TO RELATED APPLICATIONS

This application claims the benefit of U.S. Provisional Application No. 61/746,005, filed at Dec. 26, 2012, the entirety of which is incorporated by reference herein.

BACKGROUND OF THE INVENTION

1. Field of the Invention

The present invention relates to content recommendation, and in particular, to a portable electronic device and content recommendation method for recommending the most important items on a user interface based on context information and/or a user's behavior.

2. Description of the Related Art

With advances in technology, portable electronic devices, such as smart phones, tablet PCs and laptops, have become more and more popular. When a user uses his portable electronic device to capture or download multiple pictures or videos, there is a need for the user to view the most important items (e.g. photos or videos) with highlights on a user interface of the portable electronic device. However, a conventional portable electronic device does not suitably use current context information and the user's behavior sufficiently, when making recommendations. Accordingly, the conventional portable electronic device does not recommend the most important items to the user.

BRIEF SUMMARY OF THE INVENTION

A detailed description is given in the following embodiments with reference to the accompanying drawings.

In an exemplary embodiment, a content recommendation method for use in a portable electronic device is provided. The method includes the following steps of: fetching current context information from the portable electronic device; calculating a relevant ranking value of each item within each type of media files stored in the portable electronic device based on the context information; sorting the relevant ranking value of each item within each type of the media files; and displaying at least one of the items of a first user interface of the portable electronic device according to the sorted ranking values.

In another exemplary embodiment, a portable electronic device is provided. The portable electronic device comprises: a display screen; and a processor, configured to perform the following steps of: fetching current context information from the portable electronic device; calculating a relevant ranking value of each item within each type of media files stored in the portable electronic device based on the context information; sorting the relevant ranking values of the items within each type of the media files; and displaying at least one of the items of a first user interface of the portable electronic device according to the sorted ranking values.

In yet another exemplary embodiment, a non-transitory computer-readable medium comprising a computer program is provided. When executed, the computer program causes a processor of a portable electronic device to perform a content recommendation method, wherein the method comprises the following steps of: fetching current context information from the portable electronic device; calculating a relevant ranking value of each item within each type of media files stored in the portable electronic device based on the context information; sorting the relevant ranking values of each item within each type of media file; and displaying at least one of the items of a first user interface of the portable electronic device according to the sorted ranking values.

BRIEF DESCRIPTION OF THE DRAWINGS

The present invention can be more fully understood by reading the subsequent detailed description and examples with references made to the accompanying drawings, wherein:

FIG. 1 is a schematic diagram illustrating an electronic device 100 according to an embodiment of the invention;

FIG. 2A is a diagram illustrating an exemplary prism view displayed on a mobile device according to an embodiment of the invention;

FIG. 2B is a diagram illustrating an exemplary user interface of an exemplary event view according to an embodiment of the invention;

FIG. 3A is a schematic diagram illustrating the portable electronic device 100 according to an embodiment of the invention;

FIG. 3B is a diagram illustrating the flow for presenting an event on the home screen of a mobile device according to an embodiment of the invention; and FIG. 4 is a flow chart illustrating the content recommendation method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
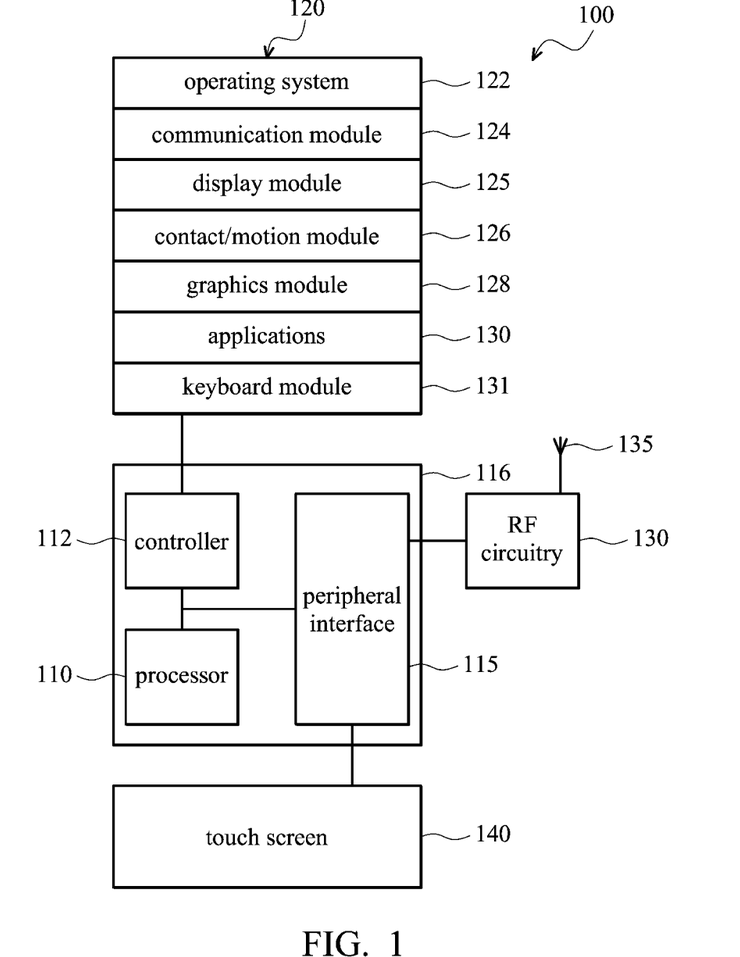

FIG. 1 is a schematic diagram illustrating a portable electronic device 100 according to an embodiment of the invention. The portable electronic device 100 may comprise a processor 110, a memory unit 120, a RF circuitry 130 and a touch screen 140. In an exemplary embodiment, the portable electronic device 100 may be a cellular telephone, a smart phone or a tablet PC. The processor 110 may be one or more data processors, image processors and/or central processors, which are capable of executing one or more types of computer readable medium stored in the memory unit 120. The processor 110 is coupled to the RF circuitry 130 and the touch screen 140 through a peripheral interface 115, as illustrated in FIG. 1.

The RF circuitry 130 may be coupled to one or more antennas 135 and may allow communication with one or more additional devices, computers and/or servers using a wireless network. The portable electronic device 100 may support various communications protocols, such as code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, Wi-MAX, a protocol for email, instant messaging (IM), and/or a short message service (SMS), but the invention is not limited thereto.

The touch screen 140 may detect contact and any movement or break thereof using any of a plurality of touch sensitivity technologies now known or to be later developed, including, but not limited to capacitive, resistive, infrared, and surface acoustic wave technologies, as well as other proximity sensor arrays or other elements for determining one or more points of contact with the touch screen 140. However, the touch screen 140 may also display visual output from the portable device 100. In some embodiments, the portable electronic device 100 may include circuitry (not shown in FIG. 1) for supporting a location determining capability, such as that provided by the Global Positioning System (GPS). In some embodiments, the touch screen 140 can be replaced by a display screen when the touch-sensitive function is not needed.

The memory controller 112 may be coupled to the memory unit 120, which may include one or more types of computer readable medium. The memory unit 120 may include high-speed random access memory (e.g. SRAM or DRAM) and/or non-volatile memory, such as one or more magnetic disk storage devices, one or more optical storage devices, and/or flash memory. The memory unit 120 may store an operating system 122, such as LINUX, UNIX, OS X, WINDOWS, or an embedded operating system such as VxWorks. The operating system 122 may include procedures for handling basic system services and for performing hardware dependent tasks. The memory unit 120 may also store communication procedures in a communication module 124. The communication procedures may be used for communicating with one or more additional devices, one or more computers and/or one or more servers. The memory unit 120 may include a display module 125, a contact/motion module 126 to determine one or more points of contact and/or their movement, and a graphics module 128. The graphics module 128 may support widgets, that is, modules or applications with embedded graphics. The widgets may be implemented using JavaScript, HTML, Adobe Flash, or other suitable computer program languages and technologies.

The memory unit 120 may also include one or more applications 130. For example, applications stored in the memory unit 120 may include telephone applications, email applications, text messaging or instant messaging applications, memo pad applications, address books or contact lists, calendars, picture taking and management applications, and music playing and management applications. The applications 130 may include a web browser (not shown in FIG. 1) for rendering pages written in the Hypertext Markup Language (HTML), Wireless Markup Language (WML), or other languages suitable for composing web pages or other online content. The memory unit 120 may further include a keyboard module (or a set of instructions) 131. The keyboard module 131 operates one or more soft keyboards.

It should be noted that each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Various functions of the portable electronic device 100 may be implemented in hardware and/or in software, including in one or more signal processing and/or application specific integrated circuits.

Figure 2A:
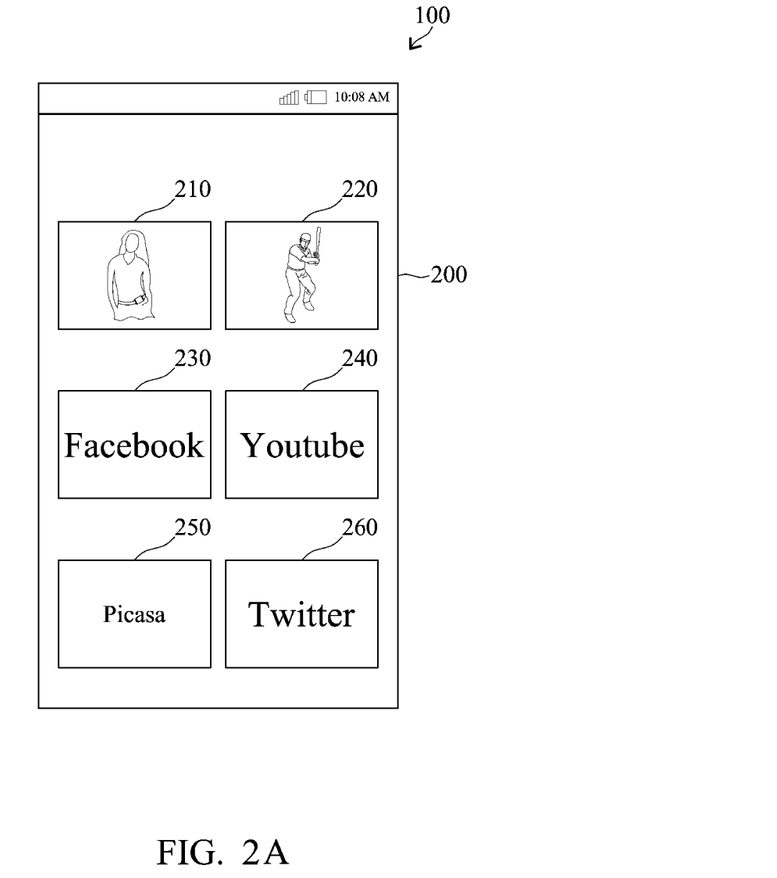
Figure 2B:
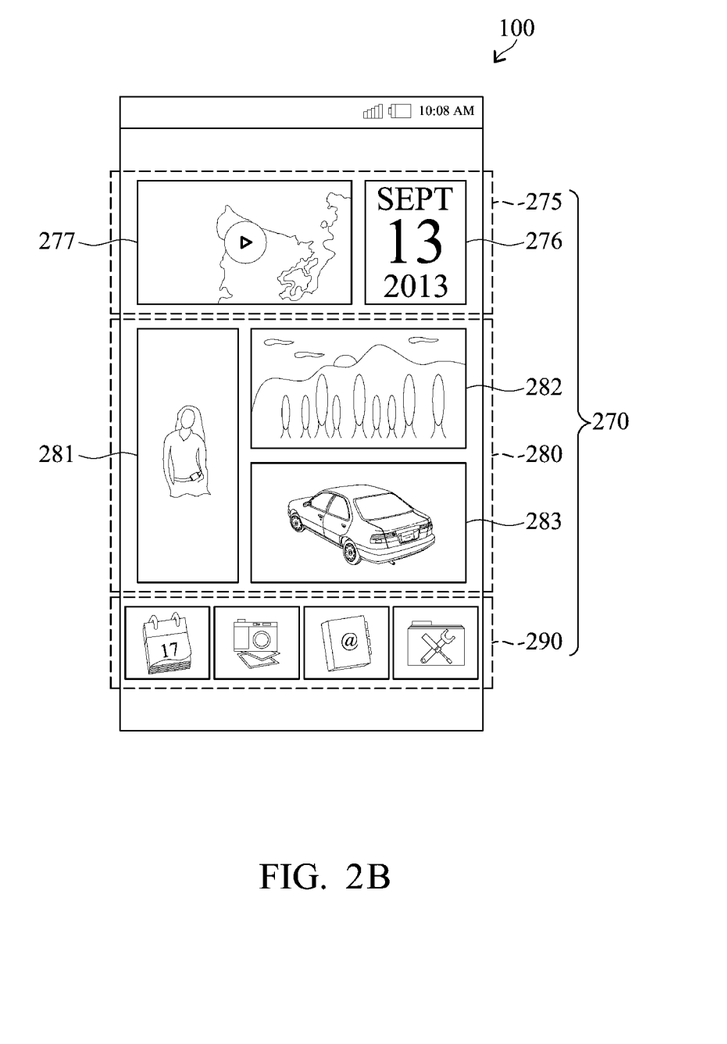

FIG. 2A is a diagram illustrating an exemplary prism view displayed on a mobile device according to an embodiment of the invention. FIG. 2B is a diagram illustrating an exemplary user interface of an event view according to an embodiment of the invention. In an embodiment, a prism view (i.e. the top layer, or the home screen) 200 is displayed on the portable electronic device 100, as illustrated in FIG. 2A. The prism view is a view that displays only a handful of selected events from a contextual query. In other words, the prism view may comprise various non-highlighted/highlighted thumbnails or icons illustrating representative events, special local media files, and/or social events, such as thumbnails 210~220 illustrated in FIG. 2A. The thumbnail 210 may indicate the most representative picture of all pictures and/or video, and the thumbnail 220 may indicate the most important event. Thumbnails 230-260 displayed on the prism view may indicate other functionalities of the portable electronic device 100 or social networks, such as Facebook, Youtube, or Picasa, etc. When the user presses the thumbnail 220, the portable electronic device 100 may enter the event view 270 representing a specific event, as illustrated in FIG. 2B. As illustrated in FIG. 2B, the event view 270 may comprise an information column 275, a highlighted column 180, and a media column 290. The information column 275 may comprise a time column 276 and a geographical information column 277. The highlighted column 280 may have multiple highlighted thumbnails 281~283, which are slightly larger than the regular thumbnails displayed in the media column 290. The thumbnails 281~283 may represent the most important or most relevant media files (e.g. photos, videos, or audio files) in the event. The media column 190 may have multiple thumbnails 291~294 in a regular size. It should be noted that the thumbnails 291~294 may also represent various media files in different types, such as photos, videos, and/or audio files.

Specifically, pictures stored in the portable electronic device 100 may be presented to the user in the form of events. Pictures having similar time information and/or geographical information are usually sorted into the same event. In some embodiments, when the user is recording videos or taking photos by the portable electronic device 100, an application or the operating system (e.g. Android operating system) executed by the portable electronic device 100 may determine whether to add a tag to the frames of recorded videos or photos according to at least one of predetermined comparison rules. For example, the predetermined comparison rules may be techniques of face recognition, laughing/smiling face recognition, and/or laughter recognition (i.e. recognizing acoustic signals matching an acoustic pattern within a specific range of amplitudes and frequencies). Specifically, when the recorded frames, photos, and/or sounds match one of the aforementioned predetermined comparison rules, the application may add a tag to the associated frames/photos. Thus, the frames/photos with the same tag can be classified into the same group/event or the same folder. Alternatively, the application may further classify the frames/photos with the same tag by media type.

When a user selects a thumbnail from the prism view 200, pictures in the event associated with the thumbnail are opened for browsing. In some embodiments, some highlighted pictures, which are slightly larger than other regular pictures, are presented on the first page of the selected event. For example, the highlighted pictures may be favorite pictures of the user or recently viewed pictures of the event. In addition, the selection of favorite pictures may be based on the prior behavior of the user accomplished on the mobile device, or benefits from online services (e.g. social network). Each time when the user interact with an item (e.g. a picture, a video, or an audio file, etc.) in the way that indicates a preference, such as viewing the item or zooming the item (i.e. more examples will be described later), the portable electronic device 100 may collect the preferences and assign a rank to each picture in the event. Accordingly, the rank of each item may define whether the item will be put on the top of the screen or not. In the invention, only items with a rank over a certain threshold will be highlighted, and the highlighted items will be displayed by rank.

In the aforementioned embodiment, the portable electronic device 100 may further collect preferences from the user when the user interacts with an item. For example, the collected preferences may indicate that the user is viewing the item for a long time, zooming the item for a long time, marking the item as 'favorite' manually, or sharing the item to a friend. Accordingly, some statistical values corresponding to the item for the interactions can be obtained, such as the view count, view duration, zoom count, zoom duration, share count, and share information (e.g. likes, viewed, and people shared to). Each statistical value can be assigned with a weighting factor for each item. Then, the relevance module of the portable electronic device 100 may calculate a relevance ranking of each item based on all weighting factors of each item, and then determine the items to be highlighted. It should be noted that some weighting factors may be changed in response to the current behavior of users or the ranking of currently highlighted items. The details will be described later.

Further, the portable electronic device 100 may also collect preferences from the online services when the user interacts with an item. For example, the portable electronic device 100 may retrieve preferences (e.g. likes or dislikes) of friends of a user from a social network when the user interacts with an item on the portable electronic device 100. The portable electronic device 100 may also identify people within the item (e.g. a picture or a video) by using face recognition and evaluate which person is more important. Specifically, the portable electronic device 100 may know whether the item is related to well-known and important people by using face recognition. The user may also add remarks on the item manually, so that the portable electronic device 100 may identify the remarks on the item and evaluate the rank of the item correspondingly. In the embodiment, the call count, message count, and apparition count in pictures of each person in the contact list of the user can also be used to evaluate which person is more important.

Figure 3A:
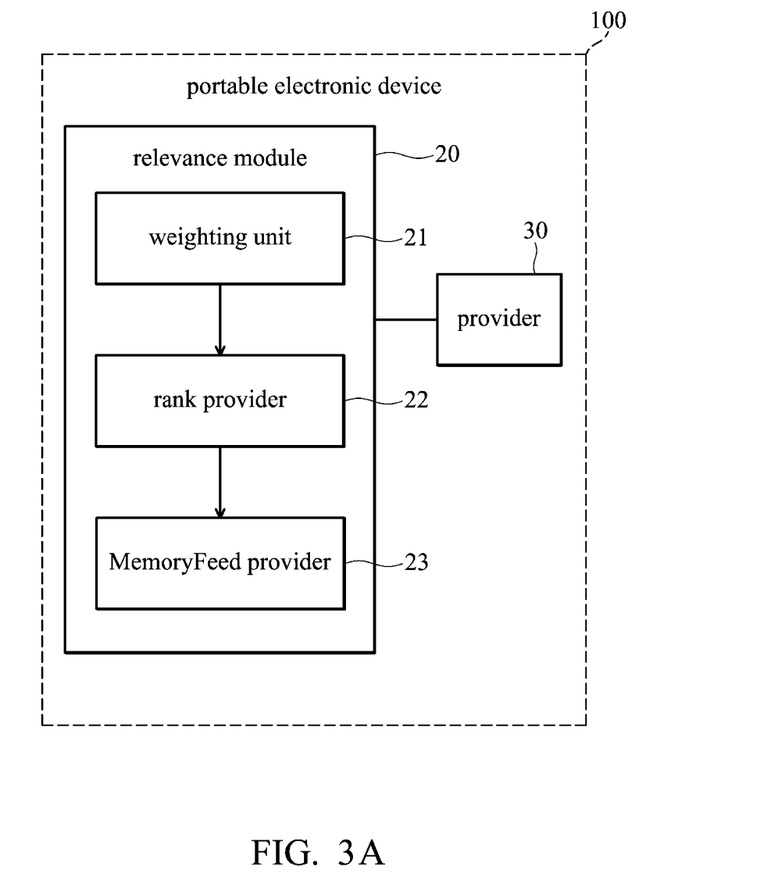
Figure 3B:
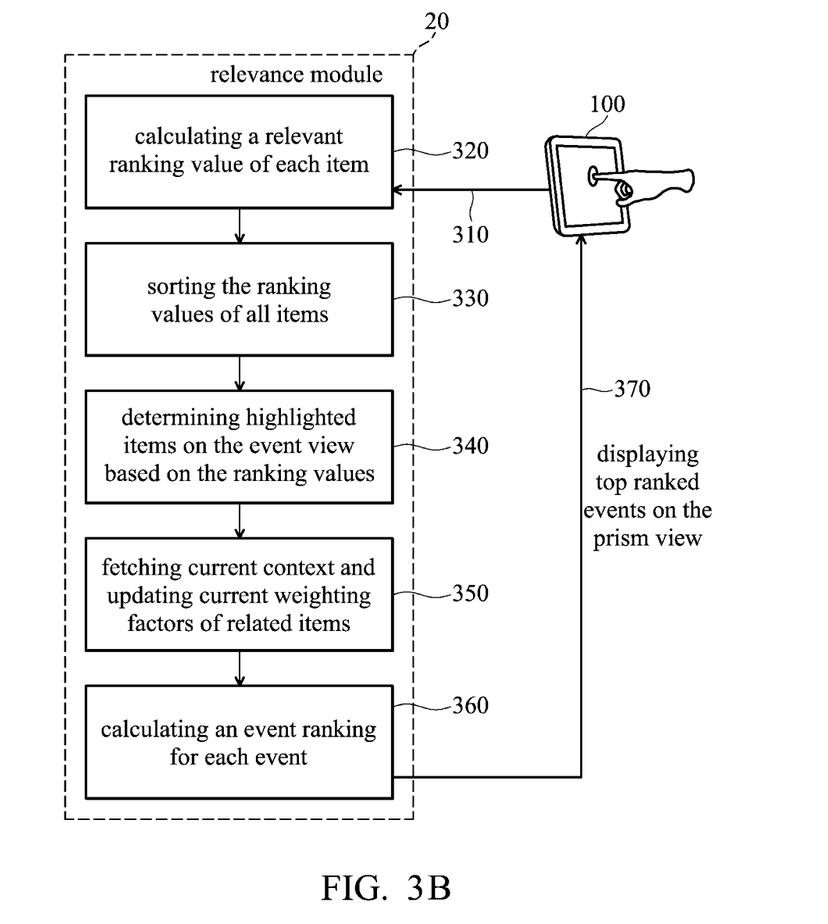

FIG. 3A is a schematic diagram illustrating the portable electronic device 100 according to an embodiment of the invention. FIG. 3B is a diagram illustrating the flow for presenting an event on the home screen of a mobile device according to an embodiment of the invention. In an embodiment, referring to FIG. 3A, the portable electronic device 100 may comprise a relevance module 20, and a provider 30. The relevance module 20 is configured to determine ranking values of all items and top events to be displayed on the prism view or the event view. The provider 30 may be a "Media Store" in an Android operating system, which stores basic information on all media, such as a unique ID, the capture time, position, size, and path of all media. The relevance module 20 may further comprise a weighting unit 21, a ranking provider 22, and a MemoryFeed provider 23. The weighting unit 21 may assign or calculate a corresponding weighting factor of each received user's behavior. The ranking provider 22 may calculate a relevant ranking value of each item and sort the ranking values of all items. The MemoryFeed provider 23 may determine the top events to be highlighted on the prism view or the event view. In addition, the MemoryFeed provider 23 is a provider that the relevance module 20 maintains, and the MemoryFeed provider 23 exposes an interface for the prism view or the gallery landing page to query contextual events (ID and reasons).

There are three defined points of interaction for the relevance module 20 (e.g. program codes executed by a processor) of the portable electronic device 100. Firstly, referring to both FIGS. 3A and 3B, applications executed by the portable electronic device 100 may transmit the behavior of users, such as viewing/sharing/starring media files, to the weighting unit 21 of the relevance module 20, as illustrated in arrow 310 of FIG. 3B. Secondly, any application executed by the portable electronic device 100 may alternate rankings of events and corresponding columns in the provider 30, that defines an event or a highlight, to be display relevant pictures only or atop. At last, only selected events will be displayed on contextual views, such as the prism home screen view or the gallery landing page. The relevance module 20 may select the events through the MemoryFeed provider 23 which provides only their IDs and reasons for selection.

In brief, applications executed by the portable electronic device 100 may transmit the behavior of users to the weighting unit of the relevance module 20 (arrow 310). Then, the ranking provider 22 of the relevance module 20 may assign weightings to each received preference, calculate a relevant ranking value of each item based on available weightings (block 320), and sort the ranking values of all items (block 330). The MemoryFeed provider 23 of the relevance module 20 may further determine items to be highlighted on the event view based on the ranking values (block 340). The MemoryFeed provider 23 may also fetch the current context displayed on the prism view or the event view, and update the current weighting factors of related items (block 350). At last, the MemoryFeed provider 23 may calculate an event ranking for each event (block 360), and then display the top ranked events on the prism view (arrow 370). It should be noted that any application executed by the mobile device can leverage or use the information from the rank provider 22 (i.e. created by the relevance module 20) and the provider 30 (e.g. "Media Store" in the Android system) to get events and highlighted items in each events.

In another embodiment, when browsing an event, the user may want to share the whole event rather than a single item (e.g. a picture or a video) with his friends. In addition, the user may be given an option to share the event with only the most important pictures. In the invention, the user may have a 'Top 10' most important/best items of the event by default. Specifically, the most important items can be determined automatically by the portable electronic device 100 or determined manually by the user. In other words, the user is able to replace the highlighted items (i.e. high-ranked items automatically determined by the mobile device) by non-highlighted items.

In yet another embodiment, the highlighted items are consolidated at a library level so that all the highlighted items or the most important items can be available at once. This automatic item selection can be used to automatically backup most important items or for display/browsing.

In yet another embodiment, the portable electronic device 100 is capable of reminding the user of the existing events, which the user may have forgotten, in some key screens, such as the home screen, or the gallery home screen. In other words, the portable electronic device 100 may, at least daily, select specific events among all of the events stored in the portable electronic device 100 based on the importance of the event and the current context information. For example, the context information may be the location and/or local time of the portable electronic device 100. Alternatively, the context information can also be time from a external server, events in a calendar of a social network device (e.g. the Chinese New Year event on Facebook), or GPS coordinates of the portable electronic device 100. Several scenarios for the embodiment will be described. In a first scenario, the user enjoys multiple good times at specific locations, such as a family home, a friend's wedding place, or where the user got married. That is, geographical information is embedded into each item. When the user returns to the location of his friend's wedding, which he attended 5 month ago, the portable electronic device 100 may illustrate a representative picture of the wedding event on the home screen, so that the user is able to browse more pictures from the wedding event. Specifically, when the user returns to the event location, the portable electronic device 100 may determine that the current location matches the event location, and then select the current item as a candidate to be displayed on the home screen. If the overall importance of the current item is high enough when compared with other candidate events, the portable electronic device 100 may display the representative picture of the current event on the home screen. Accordingly, the selection rule of the first scenario is location-based.

In a second scenario, the birthday of the user's good friend is November 20, for example. The user and his good friend celebrated a birthday meal during which numerous pictures were taken. On November 20 of the following year, the portable electronic device 100 may display a best photo from the birthday event held last year on the home screen, so that the user may click on the photo and browse other pictures of the birthday event. In other words, the selection rule of the second scenario is period-based (e.g. anniversary).

In a third scenario, the portable electronic device 100 may further determine a candidate item when the item was taken at the same time of the day and the same day of the week. In other words, the selection rule in the third scenario is time-based.

In a fourth scenario, the user starts the workweek on Monday morning. When the user unlocks his phone and refreshes the home screen, the portable electronic device 100 may remind the user of the good memories he had with his friends at the birthday party over the weekend. That is, the portable electronic device 100 may highlight the birthday party event over the last weekend on the home screen (e.g. prism view). In other words, the selection rule of the fourth scenario is based on weekend events.

In a fifth scenario, when the user unlocks his phone and refreshes the home screen, the portable electronic device 100 may display the best most recent highlighted photos on the home screen. In the sixth scenario, when the user unlocks his phone and refreshes the home screen, the portable electronic device 100 may display the best event photos captured three weeks ago. In other words, the selection rules in the fifth and sixth scenarios are based on the most recent event and previous events, respectively.

In a last scenario, the selection rules in the aforementioned scenarios may have different priority. For example, since an anniversary event happens much more infrequently, the user may be more delighted to recall the anniversary event when the anniversary event in this year is approaching. Accordingly, events selected by the selection rule in the second scenario are more important than others. It should be noted that the portable electronic device 100 is likely to display different highlighted items every time the user refreshes the home screen of the portable electronic device 100. For example, the selection rules of the aforementioned scenarios can be used in rotation.

In still another embodiment, the user may have already seen the same event a multiple of times. When the user unlocks his phone and refreshes the home screen, the portable electronic device 100 may display a representative picture of another important event on the home screen rather than the event which has been displayed for a multiple times. In other words, when an event has been selected and displayed many times, it won't be as likely to be selected as others. The more an event has appeared on the home screen, the importance of the event is decreased.

In view of the above, all the weighting factors (i.e. importance) of each item can be assigned with a numerical value. If the user marks an item as favorite manually, it may indicate that the marked item is the most important, and thus the marked item (e.g. starred item) should be highlighted. For example, a favorite weighting factor of a marked item may be 15. Further, when the user shares an item with his friends, it may indicate that the shared item may be more important than others. Thus, the weighting factor of a shared item may be 4. Similarly, when the user views or zooms an item, the respective weighting factor of the item may be 1 and 2. It should be noted that the weighting factor may be accumulated based on the statistical values, such as the share count, view count, zoom count, etc. Accordingly, an item with a sufficiently large count value can be more important than a starred item. It should also be noted that the numerical value of the weighting factors is not fixed, and the weighting factors can be set according to practical circumstances.

Figure 4:
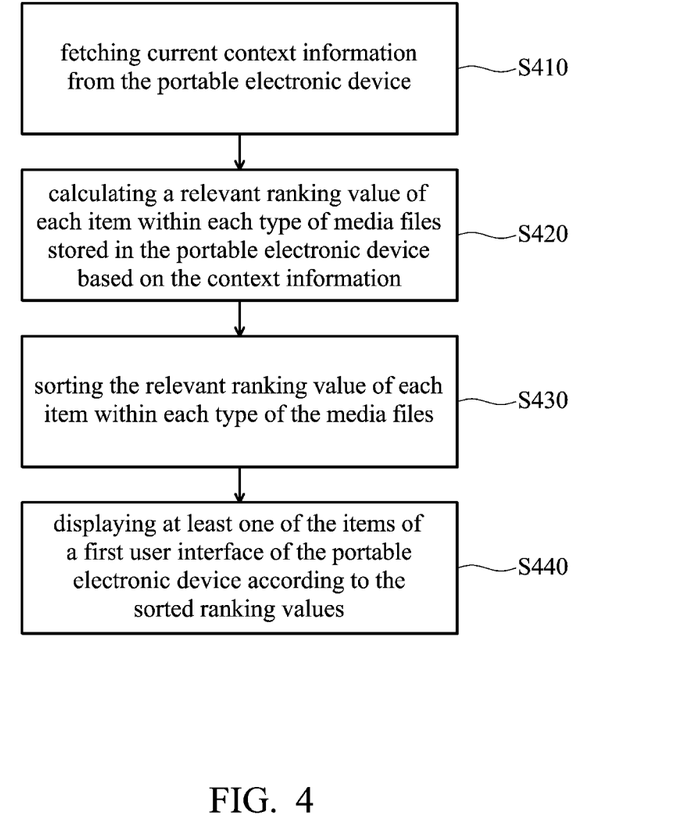

FIG. 4 is a flow chart illustrating the content recommendation method according to an embodiment of the invention. Referring to FIG. 1 and FIG. 4, in step S410, the processor 110 may fetch current context information from the portable electronic device 100. For example, the context information may be the location and/or local time of the portable electronic device 100. Alternatively, the context information can also be time from a external server, events in a calendar of a social network device (e.g. the Chinese New Year event on Facebook), or GPS coordinates of the portable electronic device 100. In step S420, the processor 110 may calculate a relevant ranking value of each item within each type of media files (e.g. photos and videos) stored in the portable electronic device 100 based on the context information. In step S430, the processor 110 may sort the relevant ranking value of each item within each type of the media files. In step S440, the processor 110 may further display at least one of the items of a first user interface (e.g. the event view or the home screen view) of the portable electronic device 100 according to the sorted ranking values. That is, there might be at least one items illustrated on the first user interface displayed on the touch screen 106 of the portable electronic device 100. In the aforementioned embodiment, the processor 110 may further highlights the at least one of the items of the first user interface (e.g. the event view of the home screen view). That is, the size the highlighted items (i.e. a representative thumbnail picture of pictures and/or videos, such as thumbnails 281~283 illustrated in FIG. 2) may be slightly larger than other non-highlighted pictures illustrated on the first user interface. Alternatively, the outline of the highlighted items can also be colored. For one having ordinary skill in the art, it is appreciated that there are many The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over

What is claimed is:

1. A content recommendation method for use in a portable electronic device, comprising:
   fetching current context information from the portable electronic device;
   calculating a relevant ranking value of each item within each type of media files stored in the portable electronic device based on the context information;
   sorting the relevant ranking value of each item within each type of the media files;
   displaying at least one of items of a first user interface of the portable electronic device according to the sorted ranking values;
   classifying the media files into multiple events;
   calculating a relevant event ranking value of each of the events according to the fetched current context information;
   sorting the relevant event ranking values of the events;
   determining a top ranked event according to the sorted relevant event ranking values;
   determining a representative picture and/or video of the top ranked event according to the sorted relevant ranking values of the items of the top ranked event; and
   displaying the representative picture and/or video of the top ranked event on a second user interface of the portable electronic device,
   wherein the relevant event ranking value of the top ranked event is decreased when the representative picture and/or video of the top ranked event has been selected and displayed a plurality of times.

2. The method as claimed in claim 1, wherein the current context information comprises a location of the portable electronic device of a user and a local time at the location.

3. The method as claimed in claim 2, further comprising:
   updating current weighting factors of the corresponding items according to a viewing behavior of the user.

4. The method as claimed in claim 1, further comprising:
   highlighting the at least one of the items of the first user interface.

5. The method as claimed in claim 1, further comprising:
   updating weighting factors of the corresponding events according to a viewing behavior of the user.

6. The method as claimed in claim 1, wherein the second user interface is an upper view of the first user interface.

7. The method as claimed in claim 1, wherein the determination of the representative picture is time-based, location-based, and/or period-based.

8. The method as claimed in claim 1, wherein the determination of the representative picture is based on the most recent event of the events or previous events.

9. The method as claimed in claim 1, wherein the representative picture is determined from the items within the top ranked event by turns.

10. The method as claimed in claim 1, further comprising sharing the items of the top ranked event to user's friends when the first user interface corresponding to the top ranked event is browsed.

11. A portable electronic device, comprising:
    a display screen; and
    a processor, configured to perform the following steps of:
       fetching current context information from the portable electronic device;
       calculating a relevant ranking value of each item within each type of media files stored in the portable electronic device based on the context information;
       sorting the relevant ranking value of each item within each type of the media files;
       displaying at least one of the items of a first user interface of the portable electronic device according to the sorted ranking values;
       classifying the media files into multiple events;
       calculating a relevant event ranking value of each of the events according to the fetched current context information;
       sorting the relevant event ranking values of the events;
       determining a top ranked event according to the sorted relevant event ranking values;
       determining a representative picture and/or video of the top ranked event according to the sorted relevant ranking values of the items of the top ranked event; and
       displaying the representative picture and/or video of the top ranked event on a second user interface of the portable electronic device,
       wherein the relevant event ranking value of the top ranked event is decreased when the representative picture and/or video of the top ranked event has been selected and displayed a plurality of times.

12. The portable electronic device as claimed in claim 11, wherein the current context information comprises a location of the portable electronic device of a user and a local time at the location.

13. The portable electronic device as claimed in claim 11, wherein the processor further updates current weighting factors of the corresponding items according to a viewing behavior of the user.

14. The portable electronic device as claimed in claim 11, wherein the processor further highlights the at least one of the items of the first user interface.

15. The portable electronic device as claimed in claim 11, wherein the processor further updates weighting factors of the corresponding events according to a viewing behavior of the user.

16. The portable electronic device as claimed in claim 11, wherein the second user interface is an upper view of the first user interface.

17. The portable electronic device as claimed in claim 11, wherein the determination of the representative picture is time-based, location-based, and/or period-based.

18. The portable electronic device as claimed in claim 11, wherein the determination of the representative picture is based on the most recent event of the events or previous events.

19. The portable electronic device as claimed in claim 11, wherein the representative picture is determined from the items within the top ranked event.

20. A non-transitory computer-readable medium comprising a computer program, which, when executed, causes a processor of a portable electronic device to perform a content recommendation method, wherein the method comprises the following steps of:

fetching current context information from the portable electronic device;

calculating a relevant ranking value of each item within each type of media files stored in the portable electronic device based on the context information;

sorting the relevant ranking value of each item within each type of the media files;

displaying at least one of the items of a first user interface of the portable electronic device according to the sorted ranking values;

classifying the media files into multiple events;

calculating a relevant event ranking value of each of the events according to the fetched current context information;

sorting the relevant event ranking values of the events;

determining a top ranked event according to the sorted relevant event ranking values;

determining a representative picture and/or video of the top ranked event according to the sorted relevant ranking values of the items of the top ranked event; and displaying the representative picture and/or video of the top ranked event on a second user interface of the portable electronic device, wherein the relevant event ranking value of the top ranked event is decreased when the representative picture and/or video of the top ranked event has been selected and displayed a plurality of times.

\* \* \* \* \*